Aug. 2, 1966    R. H. WISE    3,263,262
WINDSHIELD WIPER
Filed Nov. 4, 1964    4 Sheets-Sheet 1
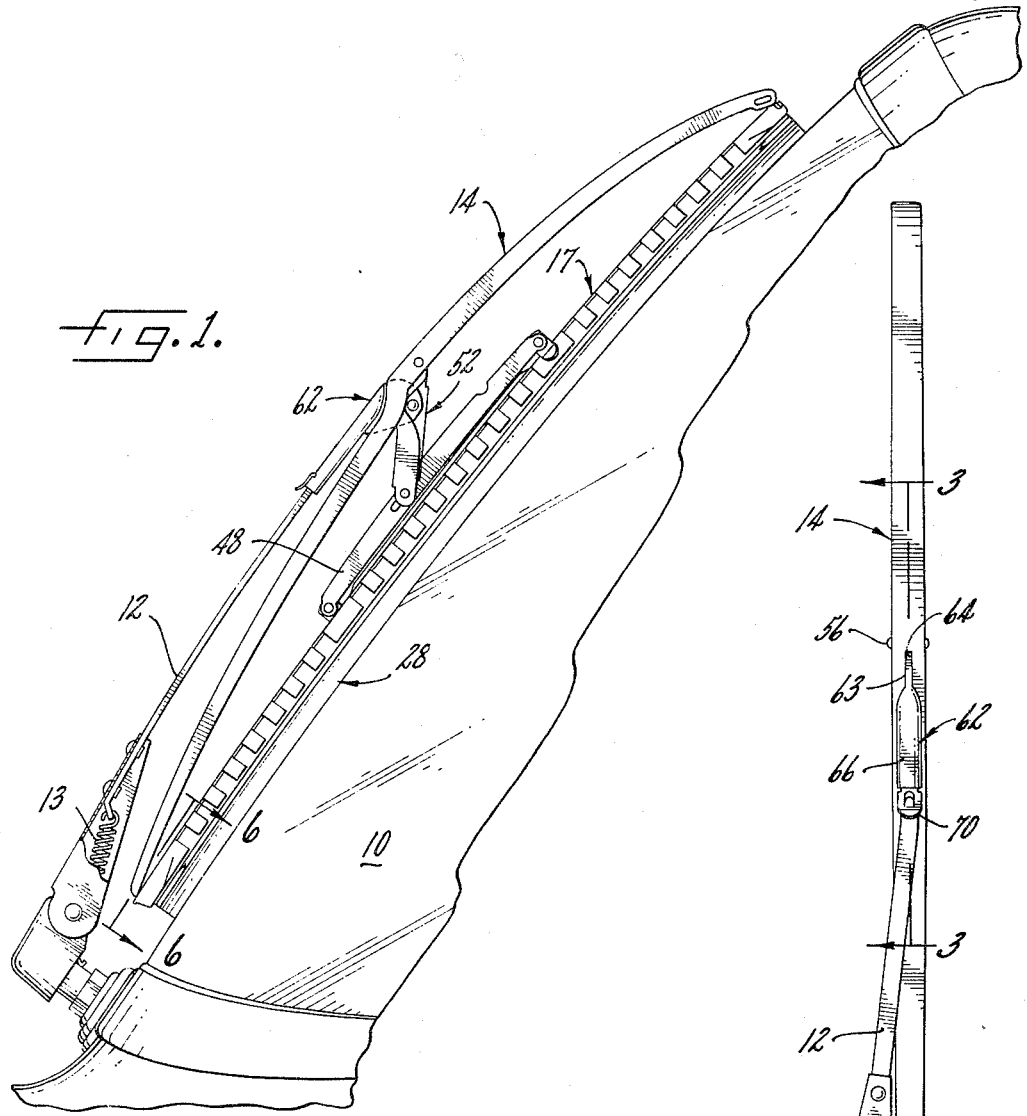
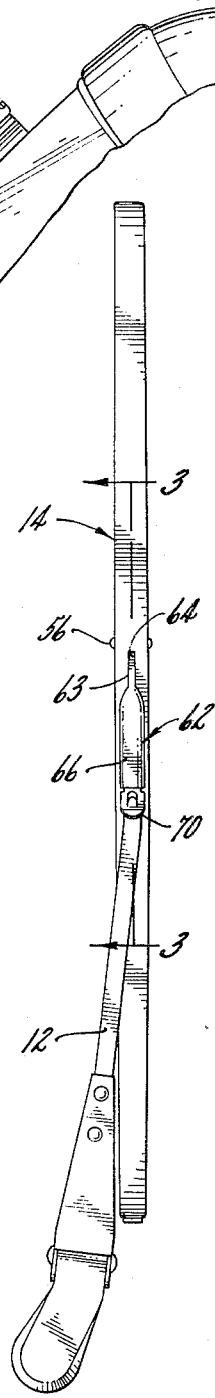
INVENTOR.
Ralph H. Wise,
BY Trask, Jenkins & Hanley
Attorneys.

INVENTOR.
Ralph H. Wise,
BY Trask, Jenkins & Hanley
Attorneys.

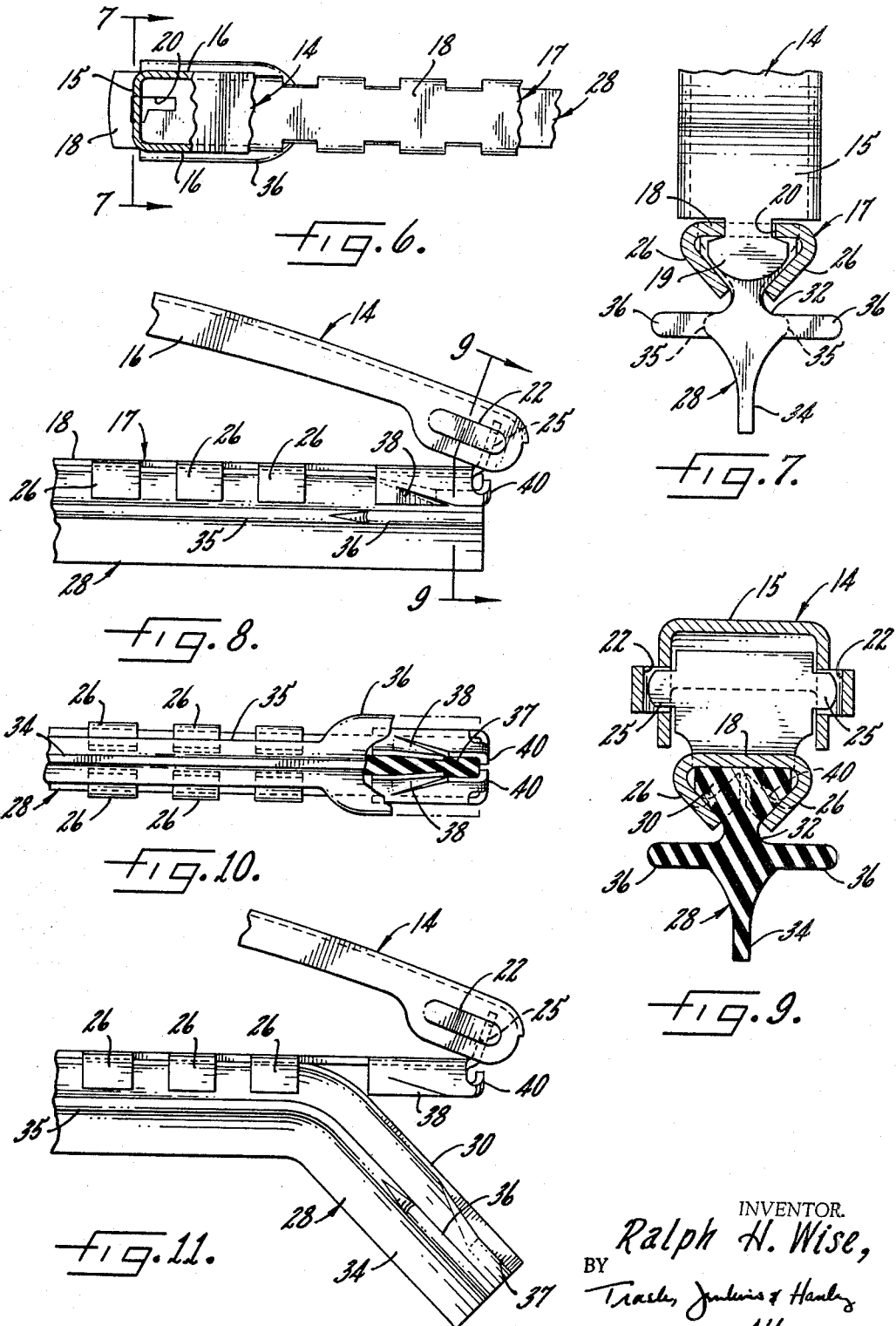

Aug. 2, 1966 — R. H. WISE — 3,263,262
WINDSHIELD WIPER
Filed Nov. 4, 1964 — 4 Sheets-Sheet 4
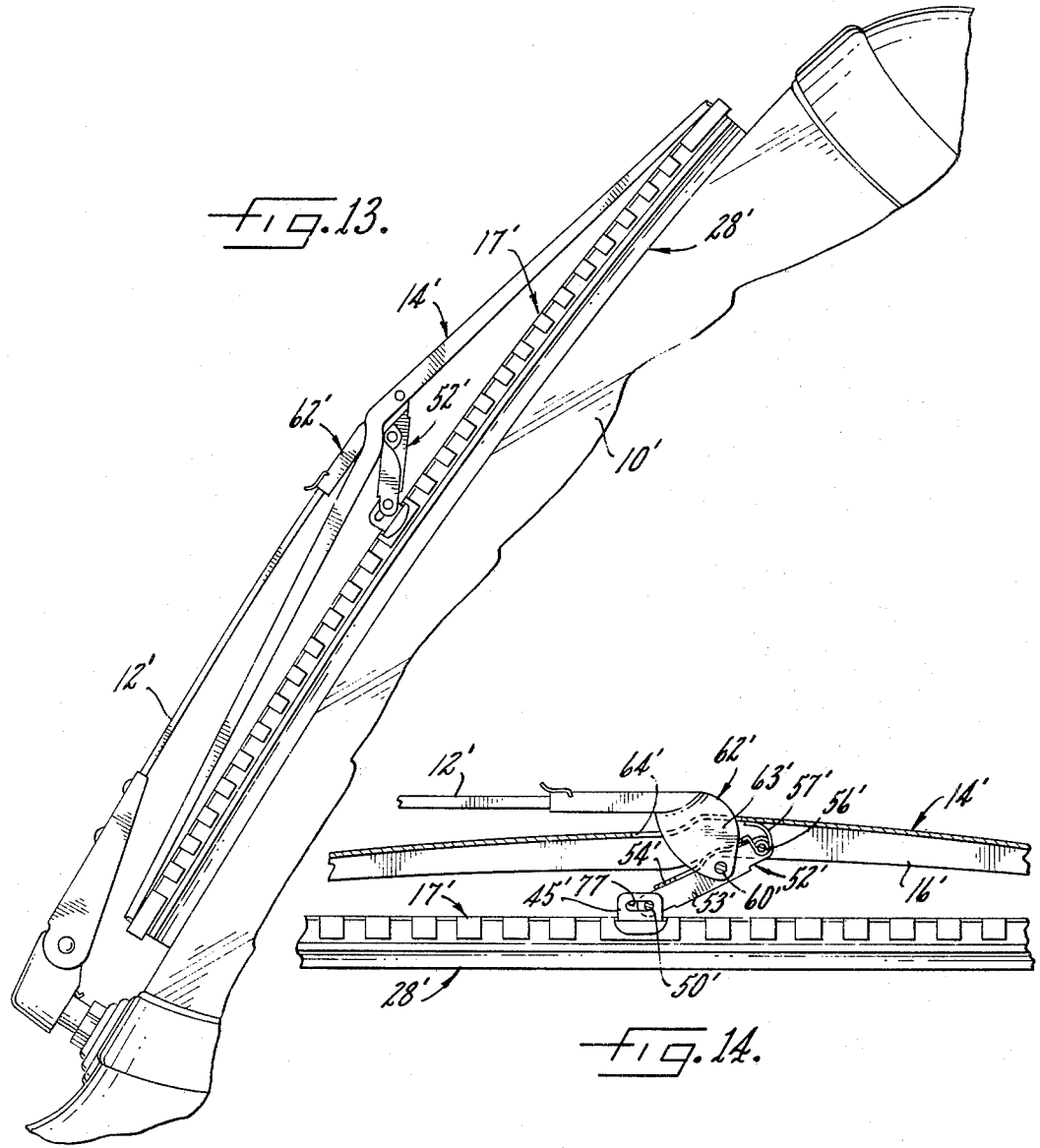
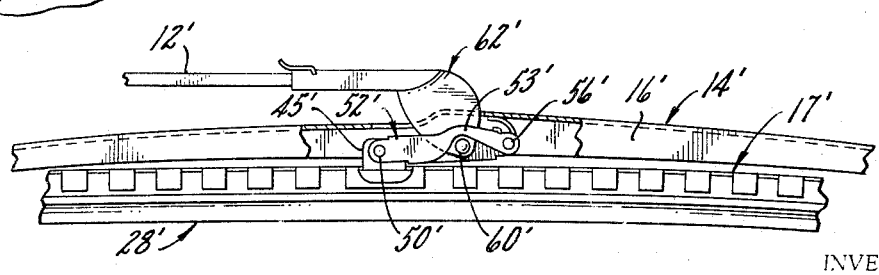
INVENTOR.
Ralph H. Wise,
BY Trask, Jenkins & Hanley
Attorneys.

United States Patent Office 3,263,262
Patented August 2, 1966

3,263,262
WINDSHIELD WIPER
Ralph H. Wise, c/o Arvin Industries Inc., Columbus, Ind.
Filed Nov. 4, 1964, Ser. No. 408,788
22 Claims. (Cl. 15—250.42)

This invention relates to a windshield wiper assembly, and more particularly to a windshield wiper adapted to clean or wipe both curved and planar surfaces.

It is an object of the invention to provide a windshield wiper assembly which will clean or wipe both curved and planar surfaces, which will provide a uniformly constant wiping pressure along its length, which can employ a replaceable squeegee element, and which will be of attractive appearance yet prove sturdy and durable in use.

In accordance with one form of the invention, there is provided an elongated arcuate bow connected at its opposed ends to the opposed ends of an elongated flexible holder. The holder is relatively rigid transversely of its width but flexible transversely of its thickness so that it can conform to the curvature of the surface being wiped. An elongated flexible squeegee is mounted in said holder and projects outwardly therefrom to engage the surface to be wiped. Desirably, said squeegee is swingable with respect to the holder about an axis parallel to its longitudinal axis.

A load bar is pivotally connected to the holder at a pair of longitudinally spaced points intermediate the ends of said holder. A link has its ends pivotally connected to the load bar and to the bow on a pair of pivot axes at least one of which is longitudinally movable. Intermediate its ends, the link is pivotally connected to a connector projecting upwardly through the bow for connection to a wiper driving arm for thus transmitting the pressure from said driving arm through the link and load bar to the holder to cause the squeegee to conform to the surface being wiped along the length of said squeegee.

Other objects and features of the invention will become apparent from the more detailed description which follows and from the accompanying drawings, in which:

FIG. 1 is a side elevation of a windshield wiper assembly embodying the invention and shown in association with the convex surface of a windshield;

FIG. 2 is a top plan view of the wiper assembly shown in FIG. 1;

FIG. 6 is an enlarged fragmentary horizontal section taken on the line 6—6 of FIG. 1;

FIG. 7 is a vertical section taken on the line 7—7 of FIG. 6;

FIG. 8 is an enlarged fragmentary side view of one end of the assembly shown in FIG. 1;

FIG. 9 is an enlarged vertical section taken on the line 9—9 of FIG. 8;

FIG. 10 is a fragmentary bottom plan view of the end of the assembly shown in FIGS. 8 and 9 with parts broken away;

FIG. 11 is a side view similar to FIG. 8, but showing the method of inserting the squeegee into the assembly;

FIG. 13 is a side elevation of a modified form of the wiper assembly shown in FIG. 1, and showing said assembly in combination with the convex surface of the windshield;

FIG. 14 is a fragmentary vertical section of the assembly shown in FIG. 12; and

FIG. 15 is a fragmentary vertical section similar to FIG. 13, but showing the assembly in a retracted nested position.

Figure 3:
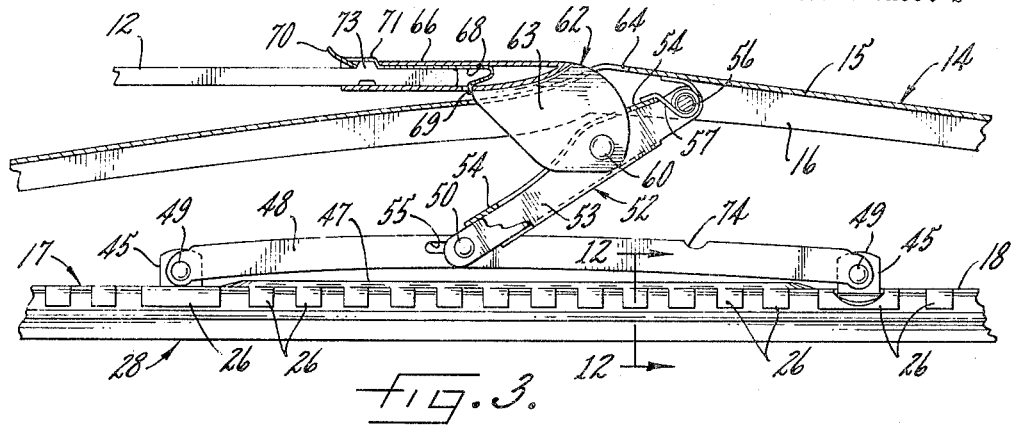
FIG. 3 is an enlarged fragmentary vertical section taken on the line 3—3 of FIG. 2.

As shown, the instant invention is adapted to clean or wipe a curved or planar windshield 10. The assembly is connected to a conventional driving arm 12 for traversing it across the windshield and provided with a spring 13 for forcing the wiper assembly against said windshield.

As shown in the drawings, the wiper assembly comprises a rigid arcuate bow 14 having a channeled cross-section including a web 15 interconnecting a pair of laterally spaced generally parallel legs 16. The bow is connected at its opposed ends to the opposed ends of an elongated holder 17 relatively rigid transversely of its width but flexible transversely of its thickness. As shown in FIGS. 6 and 7, one end of the bow web 15 is formed into a foot 19 which is received in an L-shaped opening 20 formed in the adjacent end of the holder web 18 for thus pivotally connecting one end of said bow and holder together. As shown in FIGS. 8 and 9, the opposite end of said bow and holder are joined together by a slidable connection. To this end, elongated slots 22 are formed in the bow legs 16 and a finger having laterally projecting ears 25 projects upwardly from the holder web 18 with the fingers 25 being slidably carried in said slots. If desired, the bow and holder can be slidably interconnected at both of their ends.

As shown, the holder 17 is provided with plurality of longitudinally spaced fingers 26 extending downwardly and inwardly from the opposed longitudinal edges of its web 18 to thus define with said web an elongated generally triangularly shaped channel. A squeegee 28 formed from an elastomeric material is mounted in the holder and comprises a generally triangularly shaped head 30 carried within the holder channel. Said head is interconnected by a neck 32 of substantially reduced cross-sectional thickness interposed between the opposed edges of the fingers 26 to a wiping portion 34 projecting outwardly from the holder to engage the windshield surface 10. Desirably, the wiping portion 34 is provided with opposed laterally projecting shoulders 35 underlying the fingers 26 to prevent said fingers from rubbing against the windshield surface 10. In some applications, particularly for the longer wiper assemblies, it is desirable to extend the squeegee shoulders 35 further laterally outward at the ends of the squeegee, as at 36, to prevent the ends of the holder or bow from scratching the windshield surface as the assembly is traversed across said surface.

The squeegee head 30 has a slightly smaller cross-sectional extent than the holder channel so that as the wiper assembly is traversed across the windshield surface 10 by the arm 12, the squeegee 28 will swing back and forth along an axis generally parallel to the longitudinal axis of the assembly.

As shown in FIG. 11, the pairs of fingers at the ends of the holder are spaced sufficiently far apart to permit the squeegee head 30 to be inserted between the holder fingers 26 for mounting the squeegee in the holder. The squeegee head 30 is thickened at each of its ends, as at 37, and the fingers at the ends of the holder are pointed and bent inwardly, to form tangs 38, which pierce the thickened squeegee portions 37 for releasably retaining the squeegee in the holder. The holder web 18 also has a length slightly greater than the squeegee, and the ends of the holder are bent inwardly to form a pair of abutments 40 disposed longitudinally outwardly from the squeegee ends to act in combination with the tangs 38 to prevent the squeegee from being moved longitudinally out of the holder during normal use. By compressing one end of the squeegee inwardly off of the tangs 38, the squeegee can be removed from the holder and a new squeegee inserted therein.

Intermediate the ends of the holder 17, its web 18 is struck upwardly to define a pair of longitudinally spaced ears 45. Conveniently, the web 18 is stiffened, intermediate said ears, as at 47, to thus provide the holder with a greater flexibility between each of the ears and the ends of the holder than along a portion of its length intermediate said ears. A load bar 48 is pivotally connected at each of its ends to the ears 45 by headed pins 49 to define a pair of pivot axes normal to the longitudinal axis of the assembly. Intermediate its length, the load bar 48 is pivotally connected by a headed pin 50 to a channeled link 52 comprising a pair of parallel arms 53 interconnected by a web 54. The pin 50 extends through the link arms 53 and is slidably carried in an elongated slot 55 formed in the load bar 48 to thus provide a slidable pivot connection between said link and load bar. As shown, the link legs 53 are disposed on opposite sides of the bar 48 to prevent any lateral twisting or rocking movement of the link relative to said bar. The end of the link 52 remote from the bar 48 is pivotally interconnected to the bow 14 by a headed pin 56 extending through the bow legs 16 and link legs 53. Desirably, a coil spring 57 is carried on the pin 56 with one of its ends bearing against the bow web 15 and its opposite end bearing against the link web 54 to cause said link to urge the load bar 48, and thus the squeegee 28, outwardly away from the bow 14.

Figure 4:
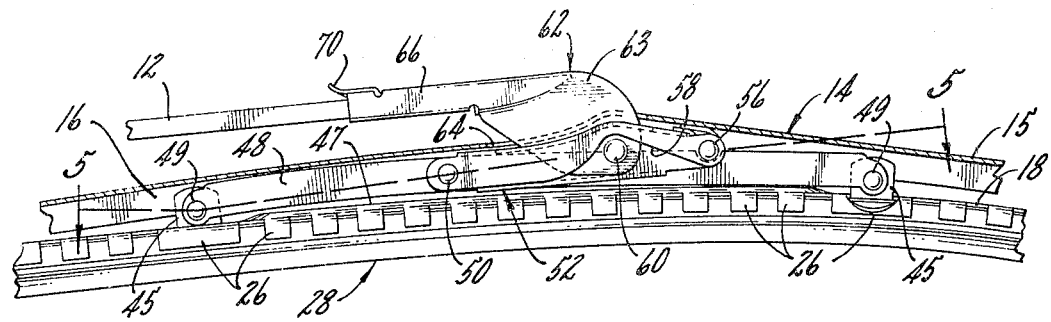
FIG. 4 is an enlarged fragmentary vertical section similar to FIG. 3, but showing the assembly in its retracted nested position.
Figure 5:
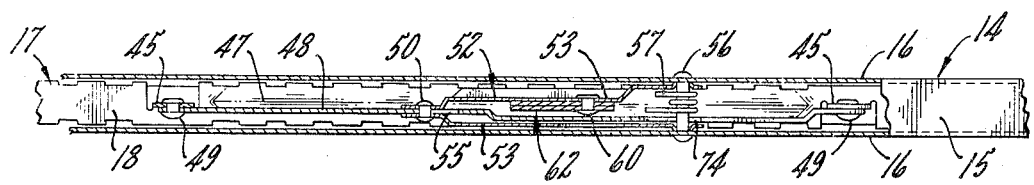
FIG. 5 is a horizontal section taken on the line 5—5 of FIG. 4.

One of the link legs 53 is recessed, as at 58, and the other leg 53 is provided with an opening for the reception of a headed pivot pin 60 joining the link 52 to a connector 62. As shown in FIGS. 3 and 4, the connector 62 comprises a flattened tongue 63 slidably carried in an elongated slot 64 formed in the bow web 15 and projecting through a slot in the link web 54 for pivotal connection to said link by the pin 60. Desirably, the slot 64 has a width only slightly greater than the width of the tongue 63 to thus prevent the bow from rocking laterally with respect to the connector. The tongue 63 projects outwardly at an angle to the link and bow, and its outer end is integrally connected to one end of a sleeve 66 having a lateral extent greater than the lateral extent of the bow slot 64 whereby said sleeve will limit the sliding movement of the tongue 63 in said slot in one direction and the pin 60 and link 52 will limit its sliding movement in an opposite direction. A hooked-leaf spring 58 is carried in the sleeve 66 and is provided at one of its ends with a tang 69 received in an opening formed in the bottom of the sleeve 66. The opposite end of said spring comprises an upwardly bent finger 70 projecting upwardly from the connector sleeve with an offset 71 being formed in the spring inwardly from the finger 70. As shown in FIG. 3, the end of one type of conventional driving arm 12 has a rectangular cross-section and is provided with a boss 73. The arm is insertable into the sleeve 66 and spring 68 with its boss 73 received in the spring offset 71 for thus interconnecting the arm and wiper assembly.

As shown in FIGS. 1 and 3, the thrust from the arm spring 13 and the spring 57 is transmitted to the squeegee through the link 52 and load bar 48 to cause the holder 17 and squeegee 28 to bend outwardly away from the bow 14. The load bar and holder will insure that a uniform thrust force will be transmitted to the squeegee throughout its length to prevent the squeegee from skip-wiping as it is traversed across the windshield. The outward bending of the squeegee in a direction away from the bow will be limited by the forward portions of the connector sleeve 66 bearing against the bow web 15 and the pivotal movement of the link 52 relative to the bow and holder.

As the squeegee wipes across a convex surface, it will bow inwardly toward the bow 14, with the link 52 pivoting about the axes of its connections to the load bar 48, bow 14, and connector 62 and the load bar pivoting about its connections to the holder 17. As the squeegee is bowed inwardly toward the bow 14, the link 52 and load bar 48 will move into a nested position in which they lie between and substantially entirely within the vertical extent of the bow legs 16, as shown in FIG. 4. To permit said link and load bar to move into their fully nested position, a notch 74 is formed in the upper edge of the load bar and is receivable around the pin 56. As the squeegee approaches its nested position shown in FIG. 4, the connector tongue 63 slides outwardly in the bow slot 64, and the connector sleeve 66 will assume a position substantially parallel to the adjacent underlying portion of said bow.

Figure 12:
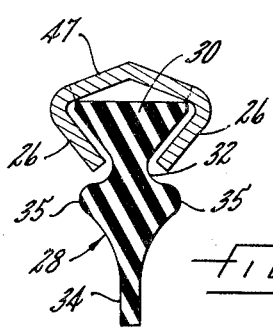
FIG. 12 is an enlarged vertical section taken on the line 12—12 of FIG. 3.

The wiper assembly shown in FIGS. 1–11 is primarily adapted for use with squeegees having lengths longer than 13 inches where for efficient wiping action it is desirable that the thrust forces be imparted to the squeegees at a plurality of longitudinally spaced points intermediate their lengths. Although the assembly shown in FIGS. 1–11 can be used with shorter squeegees, the wiper assembly shown in FIGS. 12–14 is primarily adapted for use on squeegees 13 inches and shorter, wherein it is not essential that the thrust forces be imparted to the squeegees at a plurality of points intermediate their lengths, but only at a single point intermediate their lengths. Except for differences in their lengths, the squeegee 28′ and bow 14′ of the wiper shown in FIGS. 12–14 are identical in construction to the squeegee 28 and bow 14 of the wiper assembly shown in FIGS. 1–11. The link 52′ and connector 62′ are also identical in construction to the link 52 and connector 62.

Because of its shorter length, the wiper assembly shown in FIGS. 12–14 eliminates the load bar 48. Therefore, the holder 17′ is provided with a single upturned ear 45′ located intermediate its length and is not stiffened intermediate its length. Except for these differences and the differences in its length, the holder 17′ is identical to the holder 17 shown in FIGS. 1–11. The ear 45′ is provided with an elongated slot 77, and a headed pin 50′ extends through said slot and through the arms 53′ on the link 52′ for thus pivotally and slidably interconnecting the link 52′ to the holder 17′. The link arms 53′ are disposed on opposite sides of the ear 45′ to prevent any lateral rocking movement between the link and holder. The opposite end of the link 52′ has a headed pin 56′ extending through its arms 53′ and the legs 16′ of the bow 14′ for thus pivotally interconnecting said link to the bow. The connector 62′ has a tongue 63′ slidably carried in an elongated slot 64′ formed in the bow web 15′ and projecting through the web 54′ of link 52′ for pivotal connection to one of the link legs 53′ by a pivot pin 60′. Thus, the pressure from the driving arm 12′ and the spring 57′ will be transmitted to the link 52′ to cause said link to bow the holder 17′ and squeegee 18′ outwardly from the bow 14′ to cause said squeegee to exert a wiping force against a windshield surface as the wiper assembly is traversed thereacross. As the squeegee 28′ is moved inwardly toward the bow 14′ by the curvature of the surface being wiped, the link 52′ will pivot about its connections 56′ and 50′ into a nested position lying substantially within the vertical extent of the bow arms 16′. Similarly, the holder 17′ will pivot about its connections to the bow 14′ and link 52′ into a nested position in which it also lies substantially entirely within the vertical extent of the bow legs 16′.

In each embodiment of the invention the link legs 53 or 53′ are in abutting engagement with the adjacent faces of the bow legs 16 and 16′. In a like manner the link legs 53 are in abutting engagement with the opposed adjacent faces of the holder 48 and the link legs 53′ are in abutting engagement with the opposed faces of the holder ear 45′. In this manner, the holder is prevented from rocking about its longitudinal axis as the assembly is traversed across a windshield.

I claim:

1. A windshield wiper assembly, comprising a bow, an elongated flexible holder connected at its ends to the ends of said bow, an elongated squeegee mounted in said holder and projecting outwardly therefrom to engage the surface to be wiped, a link pivotally interconnected to said bow and to said holder intermediate the ends thereof, at least one of the pivotal interconnections between said link and the bow and the holder being longitudinally movable, and a connector pivotally connected to said link intermediate the ends thereof and connectable to a wiper driving arm.

2. A windshield wiper assembly as set forth in claim 1 with the addition that said assembly is provided with biasing means acting between said link and bow to urge said link to swing about its interconnection to said bow for urging said squeegee to move outwardly relative to said bow.

3. A windshield wiper assembly, comprising a bow, an elongated flexible holder connected at its ends to the ends of said bow, an elongated squeegee mounted in said holder and projecting outwardly therefrom to engage the surface to be wiped, a link pivotally interconnected to said bow and to said holder intermediate the ends thereof, at least one of the pivotal interconnections between said link and the bow and the holder being longitudinally movable, and a connector swingably and slidably carried in said bow and pivotally connected to said link, said connector being adapted to be connected to a wiper driving arm.

4. The invention as set forth in claim 3 with the addition of means limiting the movement of said connector relative to the bow.

5. A windshield wiper assembly, comprising a bow, an elongated flexible holder connected at its ends to the ends of said bow and provided with opposed inwardly directed fingers along its longitudinal edges defining an elongated chamber, an elongated squeegee having a head received in said chamber for mounting said squeegee in the holder and a wiping portion projecting outwardly from said holder to engage the surface to be wiped, the fingers at the opposed ends of said holder piercing said squeegee head for holding said squeegee in a fixed longitudinal position in said holder, a link pivotally interconnected to said bow and to said holder intermediate the ends thereof, at least one of the pivotal interconnections between said link and the bow and the holder being longitudinally movable, and a connector pivotally connected to said link intermediate the ends thereof and connectable to a wiper driving arm.

6. A windshield wiper assembly as set forth in claim 5 in which said fingers comprise pluralities of longitudinally spaced fingers along the opposed longitudinal edges of the holder bent inwardly to give said chamber a generally triangularly shaped cross-section, said squeegee head has a generally triangular cross-section smaller than the cross-section of said chamber whereby said squeegee is tiltable with respect to the longitudinal axis of said holder, and said wiping portion of the squeegee has a pair of laternally projecting ribs adjacent its connection to said first portion.

7. A windshield wiper assembly as set forth in claim 6 with the addition that said head and wiping portion of the squeegee are interconnected by a neck interposed between the ends of said fingers.

8. A windshield wiper assembly, comprising a channeled bow having a web interconnecting a pair of legs, an elongated flexible holder having a pair of ears at one of its ends slidably carried in slots formed in the legs of the bow adjacent one end thereof and a slot at its opposite end in which a tongue on the web of said bow at the opposite bow end is received, an elongated squeegee mounted in said holder and projecting outwardly therefrom to engage the surface to be wiped, a link pivotally interconnected to said bow and to said holder intermediate the ends thereof, at least one of the pivotal interconnections between said link and the bow and the holder being longitudinally movable, and a connector pivotally connected to said link intermediate the ends thereof and connectable to a wiper driving arm.

9. A windshield wiper assembly as set forth in claim 8 in which said connector has a sleeve connectable to said driving arm and integrally connected to a tongue pivotally connected to said link, said tongue being pivotally and slidably carried in a slot formed in said bow web.

10. A windshield wiper assembly as set forth in claim 9 in which said connector has means for limiting movements of said tongue relative to said bow.

11. A windshield wiper assembly as set forth in claim 9 in which said sleeve has an opening formed therein for reception of said driving arm, and means for releasably locking said driving arm in said opening.

12. A windshield wiper assembly, comprising a bow, an elongated flexible holder connected at its ends to the ends of said bow, an elongated squeegee mounted in said holder and projecting outwardly therefrom to engage the surface to be wiped, a bar connected to said holder at a pair of longitudinally spaced points, a link connected to said bow and bar on a pair of pivot axes at least one of which is longitudinally movable, and a connector pivotally connected to said link and connectable to a wiper driving arm.

13. A windshield wiper assembly as set forth in claim 12 in which said bar is pivotally connected to said holder.

14. A windshield wiper as set forth in claim 12 in which said bar is pivotally connected to said holder, and said holder is pivotally and slidably interconnected to said bow.

15. A windshield wiper assembly as set forth in claim 12 in which said holder has less flexibility intermediate said pair of longitudinally spaced points than it does throughout the remainder of its length.

16. A windshield wiper assembly, comprising a channeled bow having a web interconnecting a pair of legs, an elongated flexible holder connected at its ends to the ends of said bow, an elongated squeegee mounted in said holder and projecting outwardly therefrom to engage the surface to be wiped, a bar connected to said holder at a pair of longitudinally spaced points, a channeled link having a web interconnecting a pair of legs, means pivotally interconnecting the bow and link legs, means pivotally interconnecting the link legs and said bar on a longitudinally movable axis, and a connector pivotally connected to said link and extending outwardly through a slot in the web of said link and bow for connection to a wiper driving arm.

17. A windshield wiper assembly as set forth in claim 16 in which said bow has an arcuate configuration and said holder is movable between a retracted position in which said bar and link are disposed substantially entirely within the vertical extent of the adjacent portions of the legs on said bow and an extended position in which said bar and link are outside the vertical extent of said adjacent portions of the bow legs.

18. A windshield wiper assembly as set forth in claim 16 in which said first mentioned means comprises a pivot pin carried in said bow and link legs, and a spring is carried on said pivot pin with its opposed ends bearing against said bow and link webs.

19. A windshield wiper assembly as set forth in claim 18 with the addition that said bar has a notch formed therein in operative alignment with said pivot pin.

20. A windshield wiper assembly, comprising a bow, an elongated flexible holder connected at its ends to the ends of said bow, an elongated squeegee mounted in said holder and projecting outwardly therefrom to engage the surface to be wiped, a unitary link pivotally interconnected to said bow and to said holder intermediate the ends thereof, at least one of the pivotal interconnections of said link being longitudinally movable, and a connector pivotally connected to said link intermediate the ends thereof and connectable to a wiper driving arm.

21. The invention as set forth in claim 20 in which said bow and link have interfitting channeled cross-sections each comprising a web interconnecting a pair of legs, said connector is swingably and slidably carried in slots formed in said webs, and the adjacent faces of the legs on said bow and link are in abutting relationship.

22. A windshield wiper assembly, comprising a bow, an elongated flexible holder connected to said bow, an elongated squeegee mounted in said holder and projecting outwardly therefrom to engage the surface to be wiped, a link operatively interconnected to said bow and holder inwardly from the ends thereof on a pair of pivot axes at least one of which is movable with respect to the other, and a connector pivotally connected to said link and connectable to a wiper driving arm.

No references cited.

CHARLES A. WILLMUTH, *Primary Examiner.*